United States Patent Office.

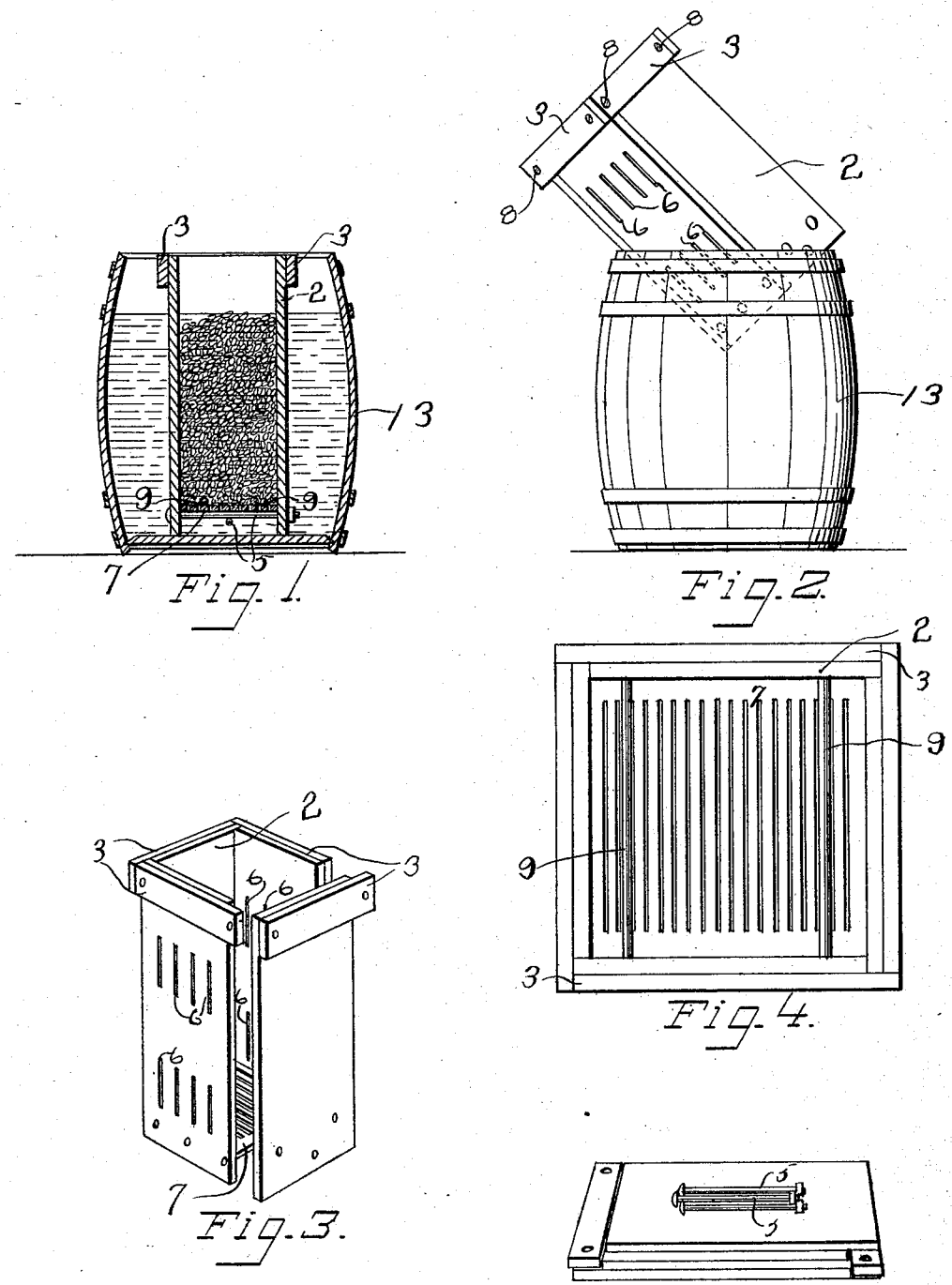

BUDD REEVE, OF BUXTON, NORTH DAKOTA.

MEANS FOR TREATING SEED.

SPECIFICATION forming part of Letters Patent No. 571,017, dated November 10, 1896.

Application filed May 15, 1896. Serial No. 591,670. (No model.)

*To all whom it may concern:*

Be it known that I, BUDD REEVE, of Buxton, Traill county, North Dakota, have invented certain new and useful Improvements in Means for Treating Seed, of which the following is a specification.

This invention relates to improvements designed especially for treating seed-wheat for the purpose of killing smut; and the objects I have in view are to provide an improved device which may be used for the purpose of treating wheat or other seed for the purpose of killing the smut.

The invention consists generally in the constructions and combinations hereinafter described, and particularly pointed out in the claims.

The invention will be more readily understood by reference to the accompanying drawings, forming part of this specification, in which—

Figure 1 is a vertical section of a device constructed in accordance with my invention and showing the manner of using the same for treating wheat. Fig. 2 is a side elevation showing the manner of using the same for drawing off the water after the seed has been treated. Figs. 3, 4, and 5 are details.

For the purpose of treating wheat or other seed I employ a receptacle open at its upper and lower ends and provided with a perforated or slotted plate or bottom arranged within it at a short distance above the lower open end of the receptacle. This plate is preferably removable and is secured in position by suitable means.

In using the device I take a barrel or other receptacle and place therein a sufficient quantity of water and sulphate of copper or any solution that will destroy smut germs on seed-grains. This acidulated water having been placed in the barrel to the required depth, I then place my receptacle therein and the water rises through the perforated bottom and through the wheat or other seed in the receptacle, as indicated in Fig. 1. The receptacle is then drawn from the barrel and may be placed thereon, as shown in Fig. 2, in which position it is left until the water has all drained off from the seed and the seed is sufficiently dry to be used in the seeder.

The receptacle 2 is preferably constructed with an open top and bottom and of rectangular form. It is preferably provided around the top with the cleats 3, which form handles by which the device may be grasped, and these cleats also serve to strengthen the top of the receptacle. The receptacle is also preferably provided near its lower ends with the transverse rods or bolts 5, upon which is placed the perforated or slotted plate 7, formed of wood, paper, or other suitable material. (See Fig. 4.) Above the plate 7 is arranged the rods or bolts 9, which extend at right angles to the bolts 5. These bolts hold the plate 7 in position, or, instead, said plate may be held in position by wooden cleats on the inside of the box or by any other suitable means. The rods or bolts 9 extend at right angles to the grain of the wood of the plate 7 and across the slots therein, and a rod may be arranged below and at right angles to the rods or bolts 5. The rods or bolts 5 serve to protect the perforated bottom and prevent its being injured when the receptacle is placed upon the ground. The receptacle 2 is preferably placed in an ordinary barrel 13, having an open top, as shown in Fig. 1, and after the seed has been treated the receptacle is raised out of the barrel and is then placed in an angular position thereon, as shown in Fig. 2, in which position the acidulated water runs back into the barrel. I may, if preferred, provide perforations or slots 6 in the wall of the receptacle, as shown in Figs. 2 and 3.

In supplying the device to the farmers the ends of the receptacle 2 may be closed and said receptacle may be used as a packing-box, in which the blue-stone that is to be used for treating the wheat may be placed.

I prefer to construct the receptacle 2 so that the same may be knocked down for the purpose of shipping. To this end I have shown the construction in Figs. 4 and 5 that I prefer to employ for this purpose. As here shown, each of the side parts of the receptacle is provided at its upper end with one of the cleats 3. The receptacle is held together by means of the rods 5 and 9 and by screws 8, which pass through the ends of two of the cleats 3 and into the edges of the side parts near the top thereof. By removing the screws 8 and the bolts 5 and 9 the receptacle can be taken apart for the purpose of shipment, and be set up again by the user by putting the parts together and inserting the bolts and screws referred to. The rods 5 preferably pass through the walls, in which they are inserted at a distance substantially equal to the thickness of the other walls of the receptacle 2, so that in setting up said device the rods 5 are first inserted and the rods 9 clamp the other side walls against the sides of the walls 2, and the rods 5 clamp the walls through which they pass against the edges of the other walls.

I prefer to use wood for the slotted or perforated plate 7 and also for the rods or bolts that hold the bottom in place, as this material is not rapidly corroded by the acidulated water. I do not, however, confine myself to the use of any particular material for this purpose. In some cases compressed paper or paper-board may be used. If the slots or perforations are of such size as to permit the wheat to pass through, cheese-cloth or other suitable material may be used over the wooden plate.

Having thus described my invention, I claim as new and desire to secure by Letters Patent—

1. The herein-described receptacle 2, provided with the open top and bottom and having the transverse rods 5 near its lower end, with the slotted or perforated bottom 7 secured upon said rods, for the purpose specified.

2. The combination, with the barrel or receptacle 13 having the open top, of the rectangular receptacle 2 adapted to set into said barrel and having the open upper and lower ends and provided with the slotted or perforated plate arranged in said receptacle above the bottom thereof, said receptacle 2 being adapted to be supported in an inclined position upon the top of said receptacle 13.

3. The combination, with the receptacle 2, open at its upper and lower ends, of the rods or bolts 5 extending across said receptacle above the lower end thereof, the slotted or perforated plate 7 resting upon said bolts, and the bolts 9 extending across said receptacle above said plate 7, in a direction at right angles to said bolts 5, for the purpose specified.

4. The combination, with the receptacle 2, formed of the separable sides and having the open upper and lower ends, the removable slotted or perforated plate 7, the bolts 5 and 9, and the screws 8, substantially as described.

5. A device for treating seed, comprising a receptacle open at its upper and lower ends and having a slotted or perforated plate extending transversely across the receptacle at a point above the bottom thereof, and means for securing said plate in position, for the purpose specified.

In testimony whereof I have hereunto set my hand this 2d day of May, A. D. 1896.

BUDD REEVE.

In presence of—
A. C. Paul,
M. E. Gooley.